United States Patent [19]
Isbell et al.

[11] Patent Number: 4,558,523
[45] Date of Patent: Dec. 17, 1985

[54] METHOD AND APPARATUS FOR EQUILIBRIUM DRYING OF GRAIN

[75] Inventors: Benny R. Isbell, P.O. Box 195, Humnoke, Ark. 72072; Joel T. Hicks, Little Rock, Ark.

[73] Assignee: Benny R. Isbell, Humnoke, Ark.

[21] Appl. No.: 658,280

[22] Filed: Oct. 5, 1984

[51] Int. Cl.$^4$ ............................................. F26B 3/02
[52] U.S. Cl. ........................................ 34/30; 34/48; 34/50
[58] Field of Search ............... 34/26, 30, 46, 48, 50; 98/55

[56] References Cited

U.S. PATENT DOCUMENTS

| | | | |
|---|---|---|---|
| 2,606,372 | 8/1952 | Foulder et al. | 34/46 |
| 2,716,289 | 8/1955 | Lauck | 34/221 |
| 2,855,697 | 10/1958 | Barre | 34/46 |
| 2,894,391 | 7/1959 | Colt et al. | 73/338.6 |
| 3,217,424 | 11/1965 | Johnson et al. | 34/48 |
| 3,264,118 | 8/1966 | Kilcrease et al. | 34/26 |
| 3,408,747 | 11/1968 | Steffen | 34/22 |
| 3,470,626 | 10/1969 | Pfeiffer | 34/46 |
| 3,934,355 | 1/1976 | Weibull | 34/46 |
| 4,043,051 | 8/1977 | Lussenden | 34/82 |
| 4,134,216 | 1/1979 | Stevens | 34/27 |
| 4,253,244 | 3/1981 | Kranzler | 34/48 |
| 4,270,280 | 6/1981 | McClaren | 34/30 |
| 4,530,167 | 7/1983 | Hotovy | 34/50 |

Primary Examiner—Larry I. Schwartz
Assistant Examiner—David W. Westphal
Attorney, Agent, or Firm—Stephen D. Carver

[57] ABSTRACT

A method and apparatus for drying stored grain based upon phenomena related to wet bulb temperature, depression, relative moisture, and relative humidity. The invention contemplates a conventional grain storage bin in which a suitable storage volume is defined beneath a lower, preferably perforated floor. A lower air plenum defined beneath the floor receives air which is circulated through the bin to dry the stored grain. When activated a relatively low capacity gas heater heats the circulating air which is forced by a conventional fan through an interconnecting vent interiorly of the bin plenum. Fuel for combustion preferably is limited by a modulating valve controlled by a temperature-sensing probe disposed within the plenum. Operation is initiated by a humidistat disposed exteriorly of the plenum, which initiates heating in response to ascertainment of a control reference humidity. For drying purposes the temperature of ambient air is raised by no more than the control depression. Additionally, it is preferred to maintain a drying temperature approximately equal to the overnight low plus the control depression, and such drying continues only as long as a control relative humidity (usually Sixty Five percent RH) is observed by the humidistat.

5 Claims, 5 Drawing Figures

METHOD AND APPARATUS FOR EQUILIBRIUM DRYING OF GRAIN

BACKGROUND OF THE INVENTION

The present invention relates generally to a system for drying grain stored within a conventional hopper, bin or the like. More particularly, the present invention is directed to methods and apparatus for drying grain by circulating air and adding controlled amounts of heat energy in response to critical sensed parameters.

In the past a wide variety of grain drying systems have been proposed. During the harvest, as will be readily appreciated by those skilled in the art, it is desirable and necessary to temporarily store grain. Harvested grains such as rice, wheat, and the like usually must be dried at least to a certain extent in order to provide an acceptable marketable commodity. Moreover it will be appreciated that the failure of the farmer to monitor the dryness of the grain often leads to reduced product quality.

Rice, for example, is most marketable when its inherent moisture content is approximately thirteen percent (13%). Harvested rice, depending upon field conditions and obviously variable weather conditions, may be characterized by a moisture content of twenty percent or more. Usually rice is not harvested until its moisture is twenty four percent (24%) or less. When rice is too dry (i.e. less than approximately thirteen percent moisture) its value for subsequent processing will be reduced. The problems inherent in storing overly moist grain are well known. For example, when stored for long periods of time overly wet grain may be subjected to souring, mold growths, rotting and the like. Consequently numerous prior art solutions have been utilized for drying grains.

Stored grain is known to exhibit stable long term moisture characteristics which are a result of the balance of the partial pressure of the moisture in the grain with the partial pressure of the moisture in the surrounding air. One of the most common ways to express this relationship is to compare grain equilibrium moisture with the relative humidity of the drying air. Temperature is also obviously important, but to a lesser extent. The most important parameter in determining relative humidity is depression, or the difference between wet bulb and dry bulb temperatures. Hence grain will be continually exchanging moisture to remain in equilibrium with the specific air which contacts it and vice-versa.

Typical grain storage bins include an internal, usually perforated floor upon which stored grain is supported. A plurality of perforations or vent passageways defined in the floor admit air through a lower plenum from associated drying apparatus to circulate air through the bin and hence dry the stored commodity. An associated fan mounted in a suitable housing externally of the bin drives air into the bin plenum through suitable ducts, and usually gas fuels an associated heater for selectively heating the air stream. Usually the air temperature is determined by "on-off" type servocontrols which may be set to regulate temperature and/or relative humidity in a continuously cycling fashion. Usually some form of stirring apparatus associated with the bin is employed during drying for circulating the grain mass. As air circulates through stored, preferably agitated grain, the net result is that some of the grain will be dried and as the cycle continues some will absorb moisture. In other words, as the conventional drying process continues various portions of the stored commodity will first lose and then gain moisture. The latter disadvantageous phenomena is related to the grain equilibrium moisture content and the quality of the circulating air.

Conventional drying systems include a gas driven heater typically capable of adding heat energy to the drying air stream at the rate of between Seven Hundred and Fifty Thousand to over.One Million BTU's per hour, which is enough to raise the flowing air temperature by fifty to eighty degrees fahrenheit. The various controls employed with such systems may include temperature switches, humidistats, which are devices responsive to relative humidity for opening or closing circuits, as well as thermocouples and the like. The aforementioned control devices affect fuel flow. Often prior art systems suffer from swings between heat and no heat conditions due to their mechanical nature, and to the time required to constantly dilute drying air near the outer wall of the bin plenum where various sensors or controls are usually mounted. This often results in a temporary period of high temperature rise which heats and overdrys grain, followed by a period where only unconditioned night air is circulated which cools and rewets the stored grain. As a result the commodity is subject to temperature and moisture induced shock.

It is also well known that when the temperature of the drying air is increased the relative humidity of the air will decrease, and hence its drying potential over a limited period of time increases. As has previously been recognized, the temperatures to which the grain may be subjected during drying are critical. Large, rapidly occurring temperature and/or moisture swings can cause fragile rice kernels, for example, to crack and break apart resulting in lowered crop quality or value. Deleterious effects from such shocks are particularly significant for the rice or grain disposed at the bottom of the bin. Consequently stirring apparatus is critical with conventional drying systems. Essentially stirring is mandatory to prevent destruction of grain near the bin bottom.

Much of the heating equipment for grain drying has been developed for crops other than rice and does not properly adapt to the specific application of rice drying. Newly harvested rice often contains a mold which is active at temperatures above eighty degrees fahrenheit and at a moisture content above approximately sixteen percent. The activity of this mold is exothermic so that as the mold grows it generates more heat, and the generated heat encourages greater mold growth. Hence one common practice has been to add heat to the forced air thereby increasing its drying potential to quickly remove moisture content above fifteen percent in the blended grain. Another approach has been to run the fan continuously for months without heating to keep the grain relatively cool and minimize mold activity.

One major problem with prior art devices is that the typical apparatus employed, such as the hardware previously developed for drying corn, will raise rice temperatures much more than what is necessary to dry the crop to approximately thirteen percent moisture. As suggested previously, because of the hardware typically employed with prior art corn drying systems rice within lower levels of the bin experiences rapidly cycling, relatively high temperatures, and the milling quality of such mistreated rice usually suffers.

The drying relationships of air and rice are based upon a wide variety of complex thermodynamic properties. In order to simplify the drying hardware, and concomitantly to decrease its cost while increasing its reliability, experiential data must be simplified in an effort to provide a concrete design goal. A variety of previously published data exists to determine the general values for equilibrium moisture content, which is the moisture content that grain will eventually arrive at if exposed to specific air conditions for a long enough period of time. Data suggested by or associated with the prior art does not reveal how fast stored grain will lose moisture as it approaches equilibrium. Instead, practical experience and observation provides general principles for postulating the long term parameters forming the goal of drying. Generally drying air characterized by a temperature in excess of the daytime high temperature has been used to increase the rate of moisture removal. This well known principle is responsible for the unfortunate "overheating" characteristic of prior art design. To minimize grain degradation prior art drying processes are usually stopped before grain can reach equilibrium with the drying air, and the resulting batch is blended to achieve an average moisture distribution.

By way of example, a typical grain storage bin having a diameter of twenty four feet may store rice at twenty-two percent moisture sixteen feet deep. Drying is effectuated by a conventional ten horsepower centrifugal fan which generates an airstream warmed by an associated one million BTU/hr. gas heater which attempts to heat the plenum to ninety degrees fahrenheit in a cycling fashion. Typically a harvest-time overnight low will be approximately sixty degrees, and the farmer will continuously operate his bin stirring apparatus. It would take such a system approximately ten days to dry the rice to the desired thirteen percent moisture (wet weight basis) if the initial "heat up" energy is recovered. In this example 5819 bushels are dried at a total drying cost of $569.56. The latter total includes approximately $166 for electrical fan power, $388 for gas (propane) fuel, and $15 for the stirring machine. An observed drying expense of approximately 9.8 cents per bushel resulted, and approximately 2079 BTU's of energy wave expended per pound of water removed.

In the prior art a wide variety of drying systems are known. Barre in U.S. Pat. No. 2,855,697 discloses a supplemental heat system for drying crops. The latter reference employs a humidistat disposed within the bin plenum for monitoring relative humidity therein. U.S. Pat. No. 3,217,424 additionally illustrates the use of a humidistat disposed below the bin plenum to turn on an associated heater whenever the humidity of air moving through the plenum chamber rises above a predetermined value. Similarly, Pfeiffer in U.S. Pat. No. 3,470,626 employs a plenum-mounted humidistat for initiating heater control. Relevant grain drying apparatus is also disclosed in U.S. Pat. Nos. 4,134,216; 3,934,355; 4,043,051; 2,716,289; 4,270,280; 2,606,372; and 3,264,118. U.S. Pat. No. 2,894,391 discloses a motor aspirated psychrometer which has been found extremely useful for measuring wet bulb temperature. Other relevant prior art includes abstract 46,214, seen on pages 985–986 of Volume 647 of the Official Gazette, 6/19/51.

A basic precept inherent in common prior art designs known to us implicitly assumes the necessity of providing heating in the order of one million (1,000,000) BTU's per hour. We have found that it is far more desirable to introduce less heat.

Moreover, we have found it desirable to limit heating input to between several thousand and approximately three hundred thousand BTU's per hour. Moreover our tests have verified that instantaneous moisture removal rates are reduced when conditioned air is generally warmer than the temperature of the rice and are increased when it is cooler. When the temperatures of the air and the grain are approximately equal, exit air quality is at equilibrium with the grain at the top of the bin, and a comparison of entrance and exit quality reveals adiabatic changes in state.

We have further determined that the observed wet bulb temperature for the majority of the grain producing regions of the United States, when measured in the evening or during the night, fall within one or two degrees of the observed overnight low. The wet bulb temperature is substantially constant during the night. This affords the opportunity to control drying air relative humidity by basing a control system upon the overnight low. As used herein the term "control depression" refers to the difference between plenum dry bulb temperature and wet bulb temperature at the overnight low. Classic depression is the single most important factor which determines relative humidity. A substantially constant relative humidity beneath the grain bin plenum may thus be maintained by preserving a constant depression. We have found it desirable to raise the temperature of drying air only an amount approximating the control depression. As will be appreciated by those skilled in the art, a reading of standard psychrometric reference charts will reveal the relationship between relative humidity, temperature and depression. Once the desired grain equilibrium moisture is referenced against known outside temperature in standard reference tables, for example, relative humidity of the required drying air may be ascertained. Subsequent reference to a standard psychrometric chart will reveal the depression required for successful practice of the present inventions.

SUMMARY OF THE INVENTION

The present invention comprises methods and apparatus for drying stored grain with a minimum of energy and with a minimum of crop deterioration. The invention broadly utilizes concepts of equilibrium moisture level in response to the temperature and relative humidity (i.e. quality) of the surrounding drying air in order to dry the grain with a minimum expenditure of energy. The concepts of the present inventions are directly related to and based upon the expected overnight low temperature, the ascertained "control depression," a similarly ascertained "control relative humidity," and the relative humidity required of drying air for attainment of a desired equilibrium moisture condition or "quality."

In simplest terms, with a first mode of the invention grain is heated with circulating air which has been warmed by an amount substantially equal to the ascertained control depression. In the best mode of the invention grain is continuously dried by air having a substantially constant temperature equal to the overnight low plus the ascertained control depression. In either mode drying continues only during those hours in which the relative humidity of ambient air exceeds an ascertained control relative humidity.

More particularly, the methods and apparatus of the present inventions are directly related to and based upon air psychrometrics and upon other observations as follows:

(a) All grains exhibit characteristics of stable moisture content which are related principally to the quality of the air in contact with it. Stated conversely, still air circulating through stored grain will assume a quality which is at equilibrium with the moisture in the grain. These characteristics are well defined in the art, having been modeled mathematically by Henderson, Chung and others;

(b) The wet bulb temperature and/or dew point of night air changes very little throughout the night;

(c) In grain growing regions, with calm overnight winds, the overnight low temperature will approach the wet bulb temperature as measured at dusk. With moderate winds, the overnight low temperature will approach the dew point;

(d) The saturation wet bulb temperature of night air may be assumed constant, either at a value measured during the night or at a value corresponding to the expected overnight low temperature, without meaningful error for grain drying purposes;

(e) If air having a constant wet bulb temperature is heated to a constant dry bulb temperature, the difference in the two temperatures being defined classically as "depression," the result is air having a substantially constant relative humidity. As used herein, "control depression" refers to a more restricted use of the term, to wit, the classic depression at saturation where wet bulb and dew point coincide;

(f) If air having a constant relative humidity is passed through grain, eventually the grain will absorb or give up moisture so that the entire mass seeks equilibrium with the quality of circulating air supplied;

(g) Regardless of its entering quality, or relative rates of flow within the normal velocity range, air will exit a grain mass at a quality which is at equilibrium with the grain at air exit (i.e. at the top of the bin); and, (h) for air encountering the first kernel of grain where equilibrium does not exist, both air and grain will move toward equilibrium with each other by energy and mass transfer.

The methods and apparatus described herein contemplate a conventional upright storage bin in which a suitable storage volume is enclosed between an upper ceiling roof and a lower, preferably perforated floor. A conventional plenum is defined beneath the floor, and drying air is introduced to the plenum to circulate through the bin to dry the stored grain. A low capacity heater nominally supplies only One Hundred Thousand BTU's per hour. At dusk heater input may run Seventy Thousand BTU's/hr., while just before dawn heat input may run Three Hundred Thousand BTU's/hr. Heat from the preferably gas powered heater is injected into the air stream established by a conventional fan which forces air through an interconnecting vent interiorly of the bin plenum. Fuel is controlled with a modulating valve, and the modulating valve is in turn controlled by an internal temperature-sensing probe which monitors temperature within the plenum. Operation is initiated by a humidistat disposed exteriorly of the plenum, which may be in mechanical contact with the heater. If the humidistat is mechanically mounted upon or secured to the associated heater sheet metal or frame an optional heat shield is added so as to isolate the humidistat thermodynamically from the associated heater hardware.

The invention contemplates that a farmer will recognize and appreciate the desired or target moisture level he wishes his grain to assume. Furthermore, the inventions described and claimed herein assume that the farmer will be able to determine, through various facts available to him, the corresponding required relative humidity of drying air which will be at equilibrium with such grain. Normally the relative humidity desired is on the order of 50% RH to 65% RH, and the values may be quickly determined by reference to public domain tables, charts and the like.

We have found that the wet bulb temperature measured at dusk will be near the wet bulb temperature measured at dawn. Moreover, the observed wet bulb temperature will be approximately constant during the nighttime hours, and it is to be emphasized that it will be substantially equal to the overnight low. Hence, the farmer will be able to at least estimate the overnight wet bulb temperature. Conversely, it must be appreciated that a measurement of the wet bulb temperature will forecast the approximate overnight low.

The invention further contemplates that the farmer (or other user of the apparatus and methods of the present invention) will be able to determine the depression required to provide drying which would be at equilibrium with grain dried to the target moisture content, since such charts and tables are readily available (See for example, Tables 1 and 2, infra). If he wishes his grain to be dried to the usual processing and marketing percentages, then the desired relative humidity of the drying air should be approximately between fifty and sixty percent RH, and the required control depression will be approximately fifteen degrees fahrenheit.

The invention contemplates the addition of merely enough heat to raise the temperature of incoming ambient air by the necessary control depression. In other words, the system will not raise the temperature of incoming ambient air above the equilibrium balance desired in the grain. In the preferred mode, the invention will maintain a relatively constant quality of air by holding constant the temperature under the bin. That is, air having a relatively constant moisture content and which is heated to a substantially constant temperature will result in air having a substantially constant relative humidity, which is in equilibrium with grain of a relatively constant moisture level.

Thus it is preferable to provide an absolute temperature limiting system to prevent the sharp temperature gradients otherwise experienced in prior art devices. It is desirable to control gas flow in the preferred modes of the present invention with a modulator valve which is controlled by a probe which monitors plenum temperature. Hence drying is effectuated by the relatively long term circulation of ambient air providing that relative humidity is within desirable parameters. For example it is contemplated to commence operation of the heater once relative humidity, as sensed by the external humidistat, rises above approximately Sixty Five percent.

Thus during normal daylight hours air will circulate to in effect dry grain with solar energy, since the air will not be raised in temperature by the gas burner. However, at critical times of the night, starting when relative humidity of ambient air exceeds Sixty Five percent (i.e. usually the control relative humidity amount), low energy heating will occur to produce a relatively gradual moisture transfer without the shock and temperature fluctuations otherwise associated with prior art devices.

By way of example, a typical grain storage bin having a diameter of twenty four feet may store rice at twenty-two percent moisture sixteen feet deep. Drying is effectuated by a conventional ten horsepower centrifugal fan and a typical harvest overnight low temperature of sixty degrees is assumed. To this point, this example is the same as the prior art example, and FIG. 5 to be subsequently described in detail will apply to both. However, this example employs the teachings of the present inventions whereby the plenum temperature is held to a 15 degree control depression all night, and the stirrers are used only to level the grain and they are thereafter turned off. In this example, the same 5819 bushels are dried in 8.65 days at a total cost of $217.21. This total includes $145.75 for electrical fan power, $69.46 for propane fuel, and $2.00 for the stirring machine. Therefore the drying expense is 3.73 cents per bushel, and energy expended is reduced to 581 BTU's per pound of water removed.

Thus a primary object of the present invention is to provide an efficient energy drying system for grains.

Another object of the present invention is to provide a drying system which will not deleteriously affect the quality of stored commodities.

A similar object of the present invention is to provide a drying system of the character described which, instead of using high heat which is switched either off or on, uses controlled relatively low heat substantially constantly to facilitate uniform heat distribution.

Yet another object of the present invention is to continuously track humidity in an effort to add heat capable of warming circulating air no more than the depression.

Another fundamental object of the present invention is to substantially reduce the utility expenses otherwise associated with commodity drying operations.

A similar object of the present invention is to minimize the use of expensive electronic sensors and electronic control apparatus and the like whereby to increase operating ease and efficiency without deleteriously affecting the quality of dried grain or rice.

Another object of the present invention is to prevent large temperature swings which hitherto have caused breaking and cracking of rice kernels during the drying process.

A similar object of the present invention is to provide a homogenous, dried mixture of market quality rice.

Another object of the present inventions is to utilize ambient air during drying for as long a period as possible.

It is a related object of the present invention to employ cooler air for relatively longer times in a drying process whereby to prevent the hitherto deleterious prior art "flip-flop" heat exchange and the resultant wasted fuel.

Another very important object of the present invention is to take advantage of the fact that wet bulb temperatures are relatively constant throughout the night at a value near the overnight low, and tend to change over periods of time much longer than a day.

Another basic object of the present invention is to avoid the constant recycling temperature phenomena experienced with conventional grain dryers.

Another object of the present invention is to provide an system for drying stored rice.

A still further object of the present invention is to provide a drying system which takes advantage of the fact that during normal drying rice disposed in certain portions of the bin will give up heat and/or moisture, while grain disposed elsewhere tends to absorb heat and/or moisture.

These and other objects and advantages of the present invention, along with features of novelty appurtenant thereto, will appear or become apparent in the course of the following descriptive sections.

BRIEF DESCRIPTION OF THE DRAWINGS

In the following drawings, which form a part of the specification and which are to be construed in conjunction therewith, and in which like reference numerals have been employed throughout wherever possible to indicate like parts in the various views.

DETAILED DESCRIPTION OF THE DRAWINGS

Figure 1:
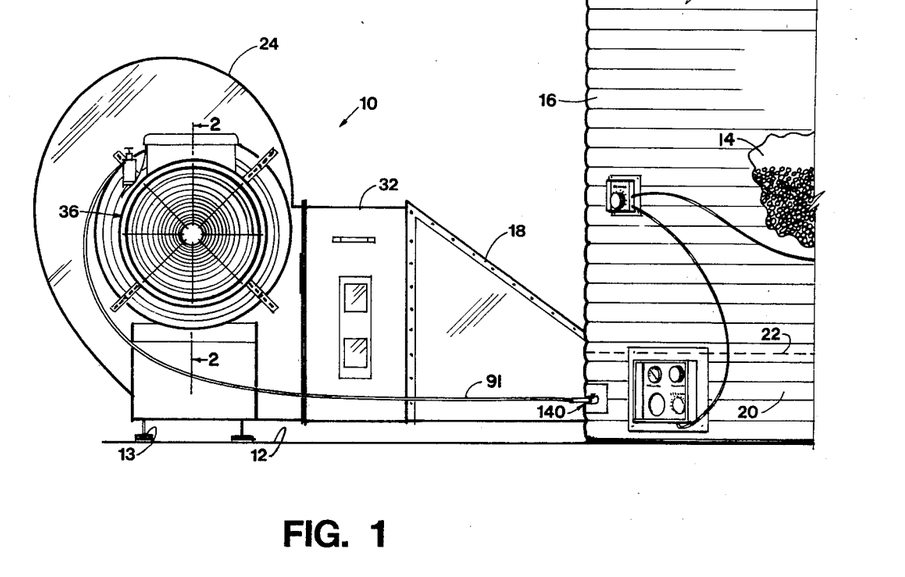
FIG. 1 is a fragmentary plan view illustrating a heater constructed in accordance with the teachings of the present invention, with a portion of a conventional associated grain bin disclosed.
Figure 2:
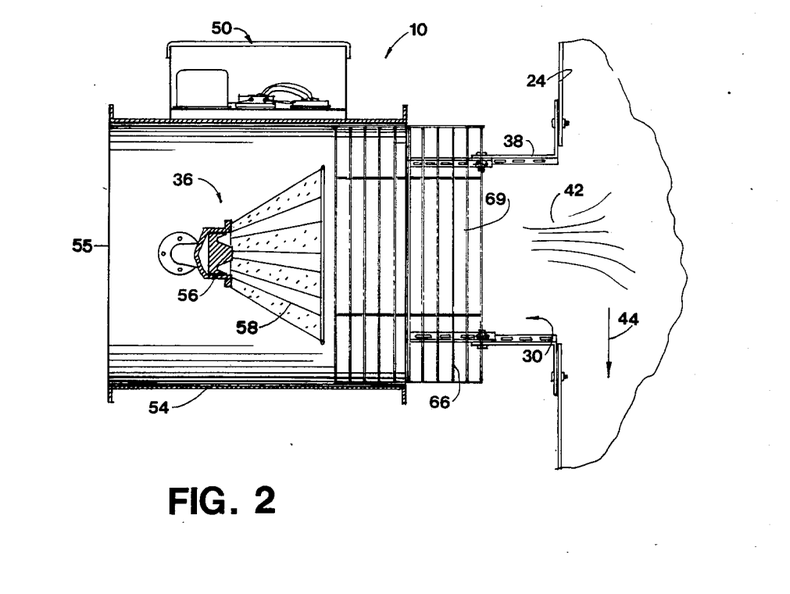
FIG. 2 is an enlarged, fragmentary side elevational view of the heater assembly as viewed from a position indicated generally by the arrows 2—2 in FIG. 1.
Figure 3:
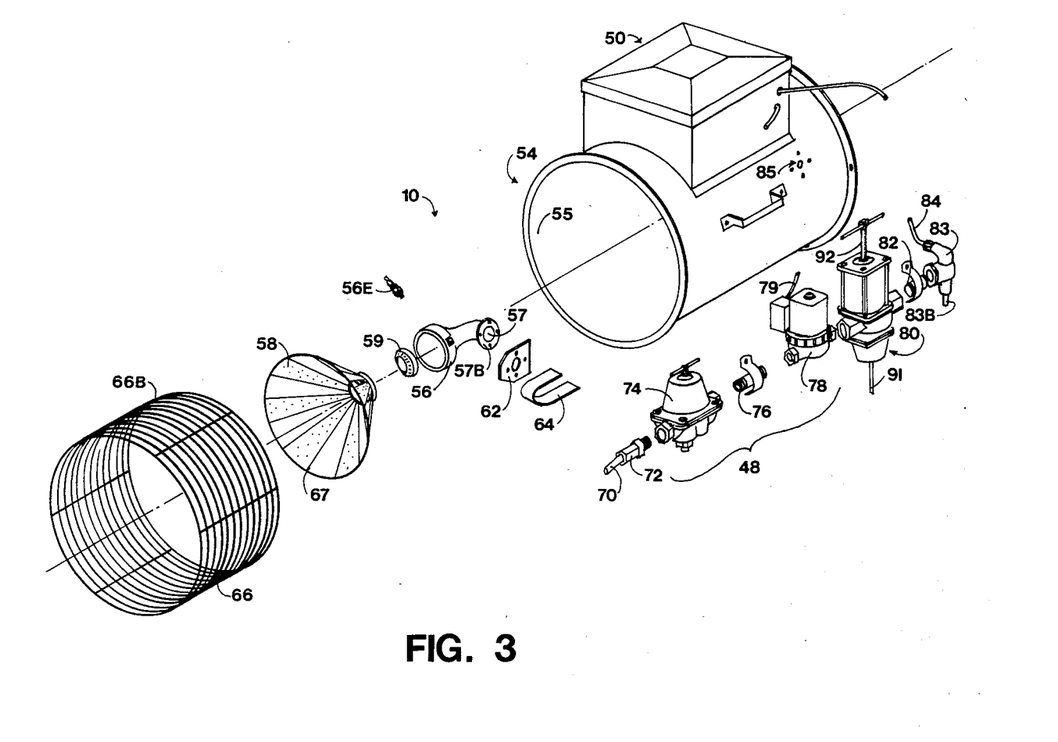
FIG. 3 is an exploded isometric view of the preferred heater system.

With initial reference now directed to FIGS. 1 through 3 of the appended drawings, a heating system for drying grain, nominally rice, is generally designated by the reference numeral 10. System 10 is adapted to be disposed upon a lower supporting surface 12 for drying rice (or other grain) 14 disposed within a conventional bin 16. As will best be appreciated from FIG. 1, bin 16 is of conventional construction, and it includes an input transition 18 coupled to the heating apparatus which selectively delivers a flow of air to a lower plenum 20 defined interiorly of the bin 16 below a perforated floor 22 of conventional construction.

A conventional fan assembly 24 driven by an electrical motor (not shown) forces air through an optional intermediate coupling 32 and the transition 18. With reference to FIG. 2, a side mounted heater, generally designated by the reference numeral 36, is mounted in offset relation with respect to the inlet of conventional fan assembly 24 by a plurality of proprietary stand-off mounts 38. The heater is adapted to generate a hot plasma, generally designated by the reference numeral 42, which is drawn into the air path generally designated by the arrow 44. As illustrated in FIG. 3, a gas control system generally designated by the reference numeral 48 delivers gas to the heater in a manner to be hereinafter described. Electrical control for the apparatus is provided by a control system generally designated by the reference numeral 50 shown in detail in FIG. 4.

The heater includes a can assembly generally designated by the reference numeral 54 which houses the internal heater components. A gun heater 56 is secured internally of the tubular can housing 55 to a diverter weldment 58. Nozzle 59 is attached to the gun heater which is mounted internally of the can 55 by a collector plate 62 and an associated collector weldment 64 of conventional construction. A drum guard 66 is preferably disposed between the output mouth 67 of the weldment 58 and the space 69 through which the flame front 42 (FIG. 2) is projected. Thus air venting occurs through the various parallel and spaced-apart rings 66B forming the drum guard 66 and through the screened can 55.

In operation the fuel supply line 70 is coupled to gas control system 48 via a conventional fitting 72 threadably coupled to a series connected regulator 74. Regulator 74 outputs via nipple 76 to a conventional solenoid 78. Solenoid 78 is electrically controlled via a line 79 to be hereinafter described. The gas output from solenoid 78 reaches a series connected modulating or proportioning valve of conventional construction, generally designated by the reference numeral 80. Depending upon the setting of valve 80, gas will be transmitted through a nipple 82 to a T-fitting 83. A primary orifice is disposed within nipple 83B, which projects downwardly from the T-fitting 83. Nipple 83B is adapted to penetrate inlet 57 of the gun heater 56 to fuel the apparatus. Holes 85 provided in can 55 facilitate the mounting of fuel control apparatus 48, and these holes 85 register with mating holes formed in the flange 57B of the gun heater 56 to internally secure same.

A conventional bypass orifice (not shown), which is part of the proportioning valve 80, is preferably used to maintain a small pilot flame when outside temperature is near or above its set point. This insures steady application of heat at minimum gas flow, which is necessary to prevent the standard internal flame-sensing probe (not shown) from erroneously tripping.

Figure 4:
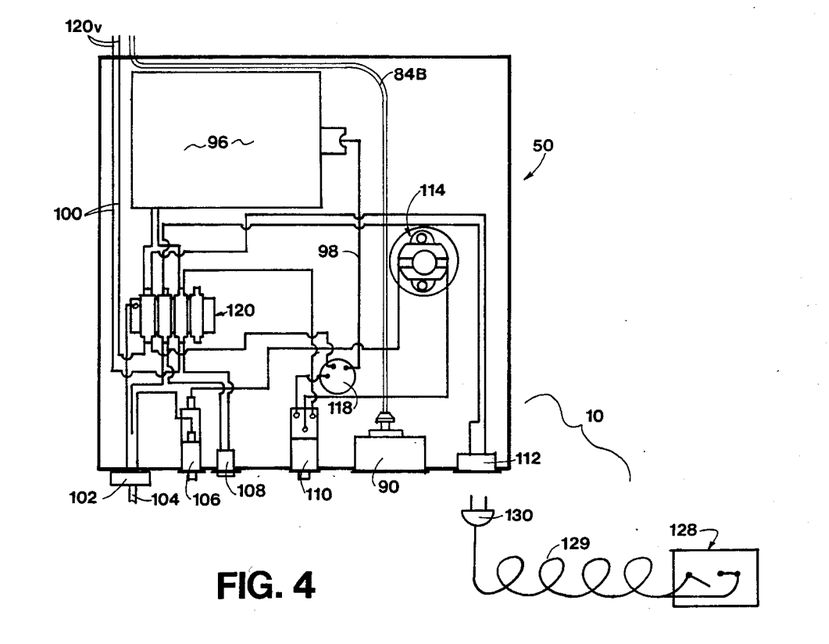
FIG. 4 is a diagrammatic view of the heater control wiring system.

An external gas line 84 coupled to T-fitting 83 extends to a pressure monitor gauge 90 located in the control box 50 (FIG. 4). With reference to FIG. 4, conduit segment 84B delivers gas to the front mounted pressure gauge 90 so that operating gas pressure may be constantly monitored in a conventional fashion. Modulating valve 80 (FIG. 3) includes a lower capillary/bulb control line 91 and a generally T-shaped, rotatable handle 92 which must be adjusted properly as hereinafter described. Thus heat energy may be provided via the previously discussed gun heater providing suitable control signals are generated and sensed by the control box 50. When activated, the high voltage electrical output from a conventional transformer 96 disposed within the control 50 will provide a high voltage output on line 98 to generate a spark in a conventional remotely disposed spark plug 56E (FIG. 3) threadably received by the gun heater 56 for igniting the flame front 42.

With reference now to FIG. 4, nominally 120 volt RMS A/C power is available across lines 100 of the control box 50 as long as the associated blower fan is on. The box 50 includes a heater interlock 102 coupled remotely via line 104, on/off switch 106, a pilot light 108, a time delay switch 110, and a humidistat/thermostat receptacle 112. A high limit switch 114 senses the temperature of the heater can. The high limit safety switch 114 will open the circuitry to the solenoid valve 78 if the fan motor fails, the inlet of the fan is blocked, or the firing rate is too high for the amount of air flowing through the heater. The manual reset and delay switch 110 will trip and shut off the flow of gas and the heater fifty seconds after the power switch is turned on, if no fuel reaches the burner because of a line obstruction, or if the flame probe (not shown) for some reason does not get hot. Electrical connection to the humidistat and the plenum high temperature safety switches is facilitated by a conventional jack 112. A junction block 120 is provided for internal wiring. For operation to commence, the circuit must be activated by a remotely disposed humidistat 128 which is coupled via a line 129 and a conventional plug 130 to jack 112. Once ignition is effectuated and the flame front is generated, the heater assembly will function according to the teachings of the present invention. Regulation of the apparatus is effectuated primarily in response to the humidistat 128 (circuit on and off typically once each day), and a remotely disposed bin plenum temperature sensor 140 (FIG. 1) which communicates with modulating valve 80 via the line 90 (FIG. 3).

In the best mode the modulating valve 80 must be included as shown; in an alternative embodiment it is proposed to primarily control the previously described heater apparatus with the humidistat 128, and in such a case the modulating valve would be omitted. Thus in the preferred embodiment modulating valve 80 regulates gas flow through the heater based upon temperature sensing through probe 140 in the plenum 20. In other words, if the temperature in plenum 20 is relatively cool the modulating valve will open further to burn more gas.

In operation it is extremely important to properly set the modulating valve by correct manipulation of the T shaped handle 92. After the fan and the heater have been turned on, the modulating valve handle 92 should be turned outwardly (counter clockwise) until it loosens and the plenum temperature has equalized. It is important to appreciate that the fan will add two to three degrees of energy to the observed plenum temperature with or without the heater. After the temperature has increased in the plenum 20, the T handle should gradually be turned in about one half turn. If the temperature under the bin is less than the desired temperature the T handle should be turned in, which increases gas flow and thus raises the plenum temperature. If the temperature under the bin within the plenum 20 is the same approximately ten minutes after the last adjustment to the modulating valve, the set point of the modulating valve will have been properly adjusted. At this point the modulating valve will now monitor plenum temperature and attempt to regulate it regardless of ambient conditions as long as the humidistat 128, the high temperature thermostat 114, and other associated safety devices do not open.

According to the present invention a bin control temperature (i.e. plenum temperature) will be chosen which is approximately equal in degrees to the expected overnight low plus the necessary control depression, which is usually fifteen degrees F. Depending upon the preference of the farmer it is acceptable to take a wet bulb temperature reading at or near local sunset, and to use this reading as the expected overnight low. Hence the modulating valve should be set to maintain a plenum temperature equal in degrees to the expected overnight low plus the control depression, according to the preferred and best mode of the invention. While the conventional blower fan will work continuously, heat application will only occur during the limited hours in which a reference "control relative humidity" is sensed by the previously described humidistat which is in contact with ambient air.

The following table presents well known equilibrium moisture averages for a stored rice crop within a bin subjected to circulating air at a given temperature and an indicated relative humidity. This table shows that air at seventy-five degrees fahrenheit and sixty percent relative humidity will dry grain at the bottom of the bin if it is wetter than 12.3 percent moisture. Similarly, grain encountered which is dryer than 12.3 percent moisture will be rewetted. The circulating air will continue to change quality by transfer of energy and mass so that it is in equilibrium with the grain with which it is in contact.

TABLE 1

EQUILIBRIUM MOISTURE TABLE FOR ROUGH RICE

| TEMP (DEGS. F.) | RELATIVE HUMIDITY (PERCENT) | | | | | | | | |
|---|---|---|---|---|---|---|---|---|---|
| | 10 | 20 | 30 | 40 | 50 | 60 | 70 | 80 | 90 |
| 35 | 6.3 | 8.3 | 9.9 | 11.3 | 12.6 | 13.9 | 15.3 | 16.9 | 19.1 |
| 40 | 6.1 | 8.2 | 9.7 | 11.1 | 12.4 | 13.7 | 15.1 | 16.6 | 18.8 |
| 45 | 6.0 | 8.0 | 9.6 | 10.9 | 12.2 | 13.4 | 14.8 | 16.4 | 18.5 |
| 50 | 5.9 | 7.9 | 9.4 | 10.7 | 12.0 | 13.2 | 14.6 | 16.1 | 18.2 |
| 55 | 5.8 | 7.7 | 9.2 | 10.5 | 11.8 | 13.0 | 14.3 | 15.9 | 17.9 |
| 60 | 5.7 | 7.6 | 9.1 | 10.4 | 11.6 | 12.8 | 14.1 | 15.6 | 17.7 |
| 65 | 5.6 | 7.5 | 9.0 | 10.2 | 11.4 | 12.6 | 13.9 | 15.4 | 17.4 |
| 70 | 5.6 | 7.4 | 8.8 | 10.1 | 11.3 | 12.5 | 13.7 | 15.2 | 17.2 |
| 75 | 5.5 | 7.3 | 8.7 | 9.9 | 11.1 | 12.3 | 13.5 | 15.0 | 17.0 |
| 80 | 5.4 | 7.2 | 8.6 | 9.8 | 11.0 | 12.1 | 13.4 | 14.8 | 16.8 |
| 85 | 5.3 | 7.1 | 8.5 | 9.7 | 10.8 | 12.0 | 13.2 | 14.6 | 16.6 |
| 90 | 5.3 | 7.0 | 8.4 | 9.6 | 10.7 | 11.8 | 13.1 | 14.5 | 16.4 |
| 95 | 5.2 | 6.9 | 8.3 | 9.5 | 10.6 | 11.7 | 12.9 | 14.3 | 16.2 |
| 100 | 5.1 | 6.8 | 8.2 | 9.3 | 10.4 | 11.6 | 12.8 | 14.1 | 16.0 |

Table 2 indicates the relationship between wet bulb depression at saturation and the relative humidity, which is taken from well known psychrometric charts, along the usual curved upper line representing the wet bulb saturation condition:

TABLE 2

| RELATIVE HUMIDITY (PERCENT) | | | | | | | | |
|---|---|---|---|---|---|---|---|---|
| 10 | 20 | 30 | 40 | 50 | 60 | 70 | 80 | 90 |
| CORRESPONDING DEPRESSION (DEGS. F.) | | | | | | | | |
| — | — | 37 | 27 | 21 | 15 | 10 | 7 | 3 |

Figure 5:
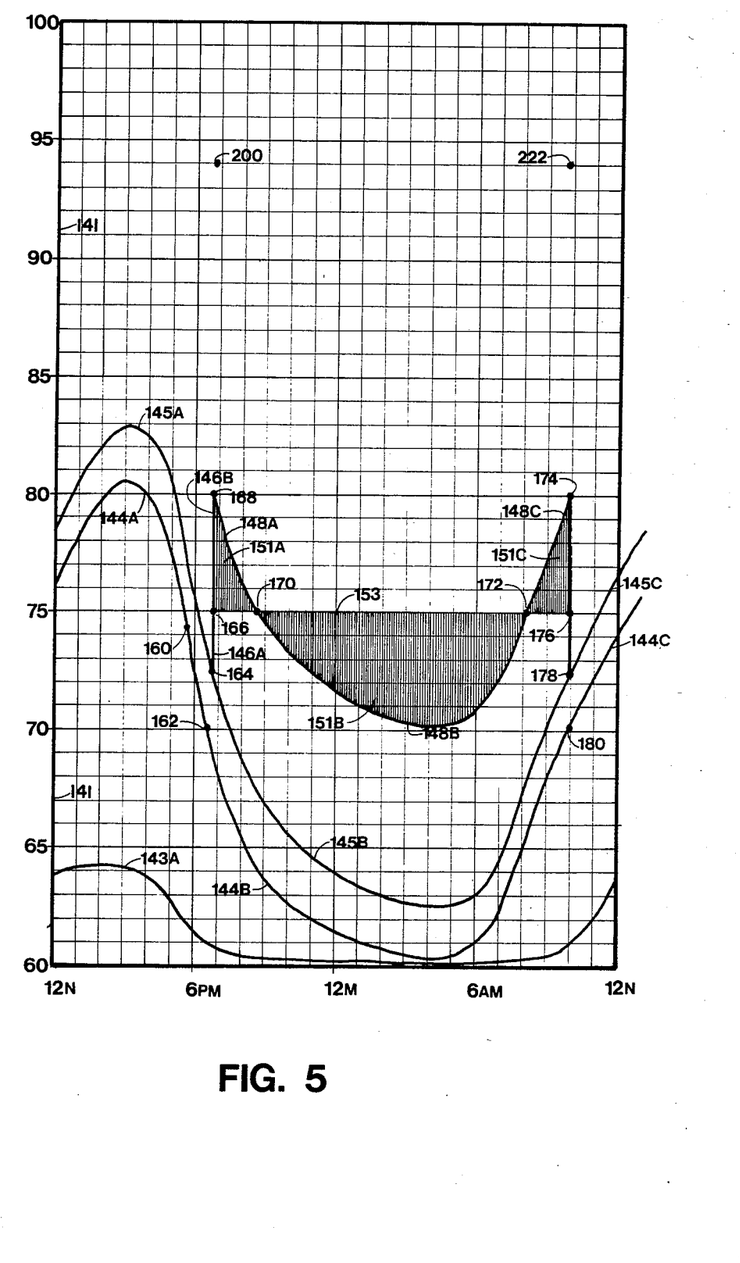
FIG. 5 is a graph plotting the approximate plenum air temperature against the time of day.

With combined reference now to FIG. 5 and Tables 1 and 2, the vertical axis 141 corresponds to temperature in degrees Fahrenheit and the horizontal axis linearly corresponds to the time of day. The outside wet bulb temperature is plotted via trace 143A. Traces 144A, 144B, and 144C reveal the corresponding ambient dry bulb temperature. The plot of the plenum dry bulb temperature referenced as traces 145A, 145B, and 145C reveals that plenum temperature is substantially equal to the ambient air temperature plus approximately two degrees from fan energy (i.e. energy added by the fan apart from the heater). This occurs as long as the fan is running and no heat is added to the system. It will be observed that the overnight low occurs approximately between four and five a.m. standard time. The plotted wet bulb low (sixty-five degrees F.) equals the dry bulb low at approximately four thirty AM, at which time the dew point may be reached, and the relative humidity of ambient air is approximately one-hundred percent (saturation).

At or near local sunset, an observed ambient wet bulb temperature (trace 143A) reveals an expected wet bulb temperature of approximately sixty degrees F. A concurrent dry bulb temperature of approximately seventy-five degrees is measured. By reference to Table 1 it is seen that if the desired target moisture content is 12.3%, this may be facilitated by continuously circulating seventy-five degree air with a relative humidity of sixty percent. (Of course forty two degree air with a fifty percent relative humidity, etc. would also work.) The thus determined relative humidity (60%) is used as the "control relative humidity" herein. The last mentioned data also provides for the calculation of the necessary "control depression," which in this example is fifteen degrees (i.e. 75 degree dry bulb minus the simultaneous wet bulb temperature, or the expected overnight low).

Alternatively, by subsequent reference to Table 2, or a conventional psychrometric chart, it may be determined that the same seventy-five degree air, when it cools to sixty degrees, will be saturated (i.e. 100% RH). Thus the expected "control depression" of fifteen degrees is again revealed.

In accordance with the invention, the heat input into the plenum will commence when the humidistat senses an appropriate ambient relative humidity equal to the selected control relative humidity of sixty percent, and, temperatures in the plenum will be increased no more that the aforementioned control depression. In other words, we have found that once an acceptable quality ambient air humidity is determined (i.e. from Table 1) then starting heating only at that relative humidity, and ending heating when ambient air relative humidity drops, (i.e. as outside air temperatures rise after sunrise) equilibrium drying according to the invention will occur. The temperature boost should raise the temperature of incoming ambient air no more than the control depression (i.e. the latter is a result of heater and fan input energy). Moreover, in the preferred mode the Johnson-brand modulator valve will provide plenum air at a constant temperature which will be equal to the wet bulb (i.e. the overnight low) plus the maximum observed or control depression (i.e. fifteen degrees in the example of FIG. 5).

The humidistat thus establishes initial heating at point 164, the trigger relative humidity of sixty percent having been established by reference to Table 1 (and a corresponding manual selection or adjustment to the programmable humidistat); an equilibrium rice drying potential of 12.3 percent moisture at the temperature of seventy five degrees is known from an inspection of Table 1. It will be apparent that from approximately ten a.m. (point 180) to six p.m. (point 160) the rice in the example is dried only by ambient air (i.e. the sun). It is to be appreciated that such an "ambient drying" cycle is desired with all embodiments of the invention. Between graphical points 160 and 162, for example, moisture is leaving the rice as a consequence of natural ambient air temperature changes at a rate commensurate with the ability of the air to hold moisture.

Point 164 is reached as soon as the fan contributes energy. In the first mode of the invention in which a fuel proportioning modulator valve is not employed, points 166 and 168 are reached along graph segments 146A and 146B after the humidistat senses that the outside (ambient) air humidity exceeds seventy percent (point 164). Subsequently the rice is heated over graph segments 148A, 148B, and 148C sequentially connecting points 168, 170, 172, and 174. With prior art "high heat" dryers points 200 and 222, which are ten to twenty degrees higher than experienced with the present invention, are often reached and exceeded. The plenum temperature associated with the operation of prior art devices will vacillate constantly over approximately five minute intervals (i.e. too small to show with the scale of FIG. 5) between the temperatures of traces 148A–C and temperatures approximately twenty degrees higher. The disadvantageous thermal shock, previously discussed, is ameliorated only by the prior art stirrers which are unnecessary with the present concept(s).

The best mode of the present invention contemplates fuel proportioning through the modulator valve. Initial heat is limited and point 164 is reached when the heater is turned on (i.e. by the humidistat). Grain drying is thus accomplished by low level heat added to the circulating airstream as indicated by the graphical traces extending between points 166, 170, 172, and 176, corresponding to the relatively flat graphical segment 153. Typically this continues for a period of approximately fourteen hours. Thus, in the preferred mode, the energy input indicated by the shaded graphical areas 151A and 151C is replaced by the energy input represented by the shaded graphical area 151B.

From the foregoing, it will be seen that this invention is one well adapted to obtain all the ends and objects herein set forth, together with other advantages which are obvious and which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

What is claimed is:

1. A method for drying grain stored in a conventional storage bin or the like to a predetermined desired moisture quality by inputting air into the bin through a lower air admission plenum and thereafter circulating air through the bin, the method comprising the steps of:
   (a) ascertaining a control depression by calculating the differences between an expected overnight low temperature of ambient air and the temperature measured at local sunset;
   (b) continuously circulating air through said bin by inputting outside ambient air into said plenum and forcing it through said grain and out of said bin;
   (c) ascertaining a control relative humidity by determining that drying air relative humidity necessary for reaching said desired grain moisture quality for circulating drying air of a dry bulb temperature approximately equal to said expected overnight low temperature of ambient air plus said previously ascertained control depression;
   (d) selectively heating air entering said plenum with a low energy heat source whereby to raise dry bulb plenum temperature to a temperature value approximately no more than the dry bulb temperature of ambient air plus said control depression; and,
   (e) initiating said selective heating step when ambient air relative humidity becomes approximately equal to said control relative humidity.

2. The method as defined in claim 1 including the further step of controlling said selective heating step by limiting the plenum temperature increase provided by said heat source in response to the dry bulb temperature within said plenum to result in a substantially uniform temperature during drying which is approximately equal to the overnight low temperature plus said control depression.

3. The method as defined in claim 1 wherein said expected overnight low temperature is determined by measuring wet bulb ambient air temperature approximately at dusk.

4. The method as defined in claim 3 including the further step of controlling said selective heating step by limiting the plenum temperature increase provided by said heat source in response to the dry bulb temperature within said plenum to result in a substantially uniform temperature during drying which is approximately equal to the overnight low temperature plus said control depression.

5. Apparatus for drying grain disposed within a conventional grain storage bin of the type having a conventional internal floor defining an air plenum below it, the apparatus comprising:
   fan means for substantially continuously circulating air through said bin and the grain stored therewithin;
   low energy heater means for selectively warming air circulating in response to said fan means;
   modulator valve means responsive to plenum temperature for controlling the flow of heater fuel, whereby to warm air during drying an amount in degrees equal to a control depression, wherein said control depression is ascertained by subtracting the expected overnight ambient air low temperature from the dry bulb temperature of ambient air as measured approximately at local sunset; and,
   humidistat means disposed outside said plenum in contact with ambient air for initiating said heater means when outside relative humidity exceeds a level which is approximately equal to a control relative humidity, wherein said control relative humidity is ascertained by determining that drying air relative humidity necessary for reaching said desired grain moisture quality for circulating drying air of a dry bulb temperature approximately equal to said expected overnight low temperature of ambient air plus said previously ascertained control depression.

* * * * *